US010827404B2

(12) United States Patent
Gupta et al.

(10) Patent No.: US 10,827,404 B2
(45) Date of Patent: Nov. 3, 2020

(54) CONTROLLING CLIENT CONNECTIVITY DURING ACCESS POINT UPGRADES

(71) Applicant: Cisco Technology, Inc., San Jose, CA (US)

(72) Inventors: Ram Gupta, Champaign, IL (US); Aditya Kadur, San Francisco, CA (US); Mark Hendrick, Jr., San Francisco, CA (US); Bo Chen, San Francisco, CA (US); Apurv Bhartia, San Mateo, CA (US); Derrick Lyndon Pallas, San Francisco, CA (US); Chun Meng Yu, Ontario (CA)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/246,408

(22) Filed: Jan. 11, 2019

(65) Prior Publication Data
US 2020/0100155 A1  Mar. 26, 2020

Related U.S. Application Data

(60) Provisional application No. 62/735,095, filed on Sep. 22, 2018.

(51) Int. Cl.
H04W 36/08 (2009.01)
H04W 36/38 (2009.01)
H04L 12/24 (2006.01)

(52) U.S. Cl.
CPC .......... H04W 36/08 (2013.01); H04L 41/082 (2013.01); H04W 36/385 (2013.01)

(58) Field of Classification Search
CPC .... H04W 36/08; H04W 36/385; H04L 41/082
See application file for complete search history.

(56) References Cited

U.S. PATENT DOCUMENTS

| | | | |
|---|---|---|---|
| 7,558,843 B2 | 7/2009 | Lipscomb et al. | |
| 2006/0094400 A1 | 5/2006 | Beachem et al. | |
| 2009/0042557 A1* | 2/2009 | Vardi | H04W 72/02 455/422.1 |
| 2009/0094351 A1* | 4/2009 | Gupta | H04W 12/08 709/220 |
| 2011/0141895 A1 | 6/2011 | Zhang | |

(Continued)

Primary Examiner — Mohammad S Anwar
(74) Attorney, Agent, or Firm — Polsinelli PC

(57) ABSTRACT

A method includes obtaining client information from a set of access points. The client information indicates client devices detected by each access point in the set of access points. In some implementations, the method includes grouping the set of access points into a plurality of access point groups based on the client information. The grouping allows each client device to associate with an access point from at least two different access point groups. The method includes, for a first access point group of the plurality of access point groups, migrating the client devices associated with access points in the first access point group to access points in a second access point group of the plurality of access point groups. In some implementations, the method includes configuring the access points in the first access point group while maintaining configuration of the access points in the second access point group.

20 Claims, 6 Drawing Sheets

(56) References Cited

U.S. PATENT DOCUMENTS

2016/0088501 A1* 3/2016 Venkataraman .... H04L 41/5025
455/424
2017/0127331 A1* 5/2017 Wu ..................... H04W 76/27
2018/0242165 A1* 8/2018 MacMullan .......... H04W 16/14

* cited by examiner

CONTROLLING CLIENT CONNECTIVITY DURING ACCESS POINT UPGRADES

PRIORITY CLAIM

This application claims priority to U.S. provisional patent application No. 62/735,095 filed on Sep. 22, 2018, the contents of which are hereby incorporated by reference.

TECHNICAL FIELD

The present disclosure relates generally to access points, and in particular, to controlling client connectivity during access point upgrades.

BACKGROUND

Access points allow client devices to connect to a network. When a client device associates with a particular access point, the client device begins receiving traffic that is destined for the client device via that particular access point. Most access points include processors that execute computer-readable instructions that are stored at the access points. For example, some access points execute software or firmware. From time-to-time, there is a need to upgrade the computer-readable instructions that the access points execute. While the firmware/software of an access point is being upgraded, the access point is offline. As such, client devices that are connected to an access point lose connectivity when the access point is being upgraded.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1A:
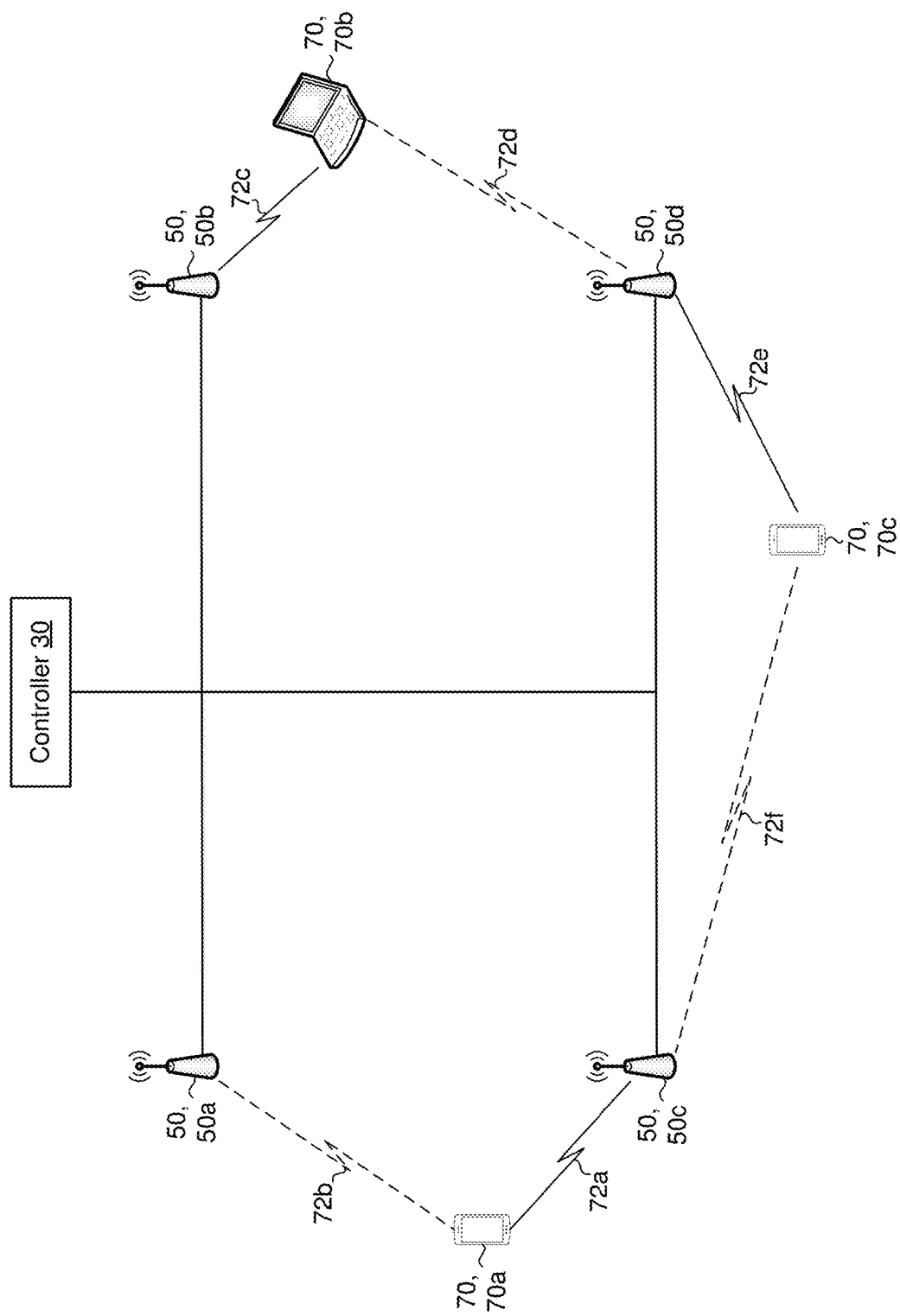
FIGS. 1A-1D are schematic diagrams of a network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for configuring a group of access points. In various implementations, a method is performed by a controller including a non-transitory memory and one or more processors coupled with the non-transitory memory. In some implementations, the method includes obtaining client information from a set of access points. In some implementations, the client information indicates client devices detected by each access point in the set of access points. In some implementations, the method includes grouping the set of access points into a plurality of access point groups based on the client information. In some implementations, the grouping allows each client device to associate with an access point from at least two different access point groups. In some implementations, the method includes, for a first access point group of the plurality of access point groups, migrating the client devices associated with access points in the first access point group to access points in a second access point group of the plurality of access point groups. In some implementations, the method includes configuring the access points in the first access point group while maintaining configuration of the access points in the second access point group.

In some implementations, each access point group is associated with a respective color. In some implementations, grouping the set of access points comprises assigning one of the colors associated with the plurality of access point groups to each access point. In some implementations, the assigning comprises determining a cost for each of the colors, and assigning one of the colors to each access point based on the cost of the colors. In some implementations, the cost of a particular color is a function of a number of client devices that lose connectivity when the access points corresponding to the particular color are being configured.

In some implementations, migrating the client devices comprises dissociating the client devices from the access points in the first access point group, and associating the client devices with the access points in the second access point group.

In some implementations, configuring the access points comprises installing a configuration update at the access points in the first access point group and rebooting the access points in the first access point group, and maintaining the configuration of the access points in the second access point group at least until the access points in the first access point group have rebooted.

In some implementations, the method comprises transmitting configuration information to the set of access points.

In some implementations, the method comprises determining that each access point in the set of access points is to be updated.

In various implementations, the present disclosure provides a controller comprising a processor provided to execute computer readable instructions included on a non-transitory memory. In some implementations, the controller includes a non-transitory memory including computer readable instructions, that when executed by the processor, cause the controller to obtain client information from a set of access points. In some implementations, the client information indicates client devices detected by each access point in the set of access points. In some implementations, the controller groups the set of access points into a plurality of access point groups based on the client information. In some implementations, the grouping allows each client device to associate with an access point (e.g., a single access point) from at least two different access point groups. In some implementations, for a first access point group of the plurality of access point groups, the controller migrates the client devices associated with access points in the first access point group to access points in a second access point group of the plurality of access point groups. In some implementations, the controller configures the access points in the first access point group while maintaining configuration of the access points in the second access point group.

Example Embodiments

The present disclosure relates to controlling client connectivity during access point upgrades. Traditionally, when a set of access points are to be upgraded, the access points are taken offline and the client devices connected to the access points lose network connectivity. According to the present disclosure, access points are grouped into several access point groups. Client devices associated with a particular access point group are handed-off to access points in another access point group while access points in that particular access point group are upgraded. Instead of upgrading all access point groups at the same time, the upgrades are staggered across the access point groups. As such, each client device has access to at least one online access point while other access points are offline due to an ongoing upgrade thereby reducing network connectivity loss during access point upgrades and improving network availability.

FIG. 1A is a schematic diagram of a network environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 10 includes a controller 30, various access points 50 (e.g., a first access point 50a, a second access point 50b, a third access point 50c, and a fourth access point 50d), and various client devices 70 (e.g., a first client device 70a, a second client device 70b, and a third client device 70c).

While the controller 30 is shown as being separate from the access points 50, in some implementations, the controller 30 is integrated into one or more of the access points 50. For example, in some implementations, one of the access points 50 (e.g., the first access point 50a) serves as a master access point that includes the functionality of the controller 30. In some implementations, the client devices 70 include tablets, smartphones, laptops, desktops, or IoT devices such as wearable computing devices, appliances and sensors. In some implementations, the access points 50 include Wi-Fi access points. In some implementations, the access points 50 include cellular access points.

In some implementations, the client devices 70 detect (e.g., sense via a short-range communication transceiver) multiple access points 50. In such implementations, a client device 70 is able to associate with (e.g., connect to) any one of the multiple access points 50 that the client device 70 detects. In the example of FIG. 1A, the first client device 70a detects the first access point 50a and the third access point 50c. As indicated by solid link 72a, in the example of FIG. 1A, the first client device 70a is associated with (e.g., connected to) the third access point 50c. As indicated by dashed link 72b, in the example of FIG. 1A, the first client device 70a has the option of associating with (e.g., connecting to) the first access point 50a but the first client device 70a is not currently associated with the first access point 50a. As indicated by solid link 72c, the second client device 70b is associated with the second access point 50b. As indicated by dashed link 72d, the second client device 70b has the option to associate with the fourth access point 50d. As indicated by solid link 72e, the third client device 70c is associated with the fourth access point 50d. As indicated by dashed link 72f, the third client device 70c has the option to associate with the third access point 50c.

Figure 1B:
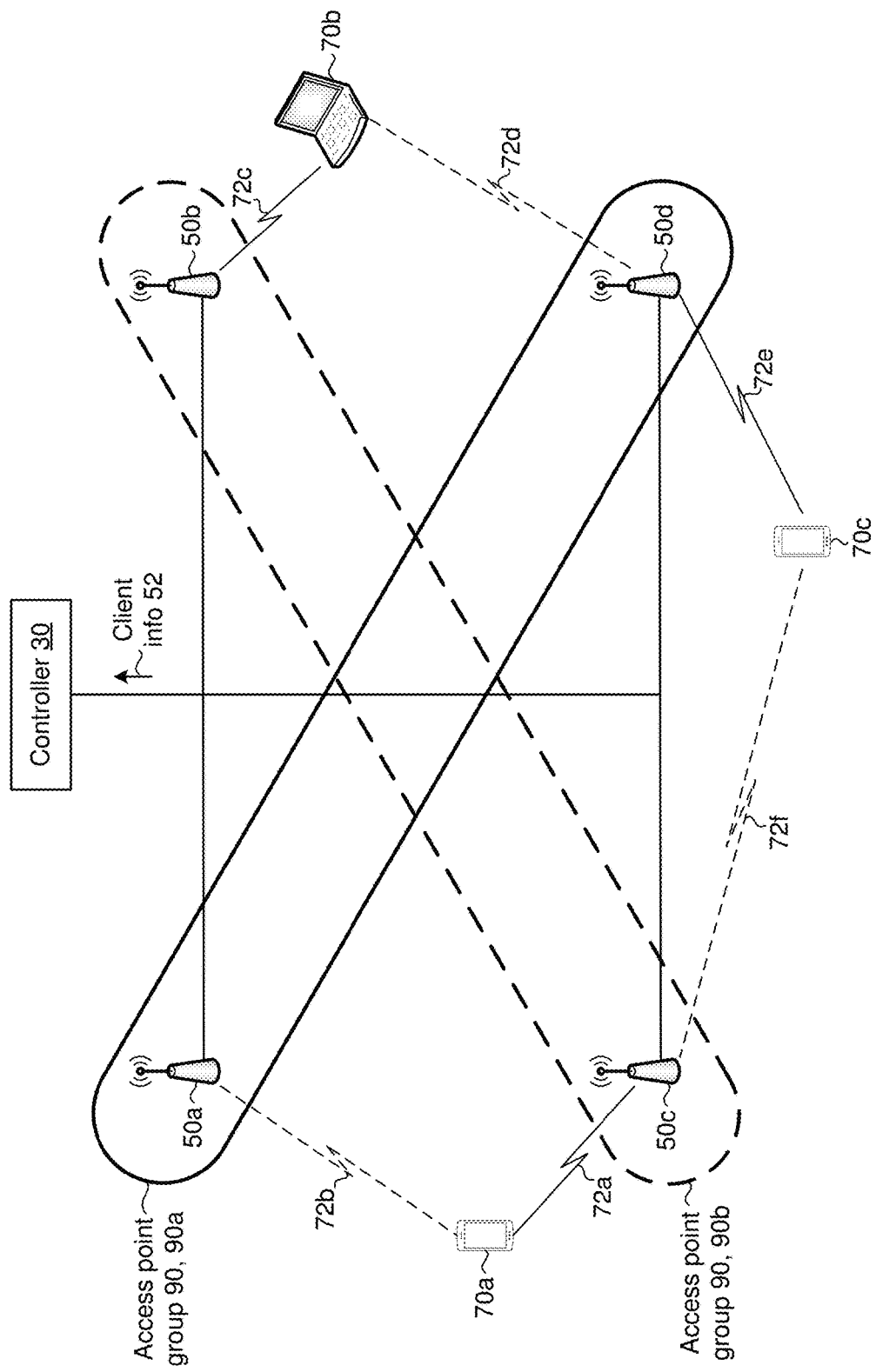

Referring to FIG. 1B, in some implementations, the controller 30 obtains client information 52 from the access points 50. In some implementations, the client information 52 indicates which client devices 70 the access points 50 detect (e.g., sense). For example, the client information 52 indicates that the first access point 50a detects the first client device 70a, the second access point 50b detects the second client device 70b, the third access point 50c detects the first and third client devices 70a and 70c, and the fourth access point 50d detects the second and third client devices 70b and 70c. In some implementations, the client information 52 indicates which client devices 70 the access points 50 are currently associated with, and which client devices 70 the access points 50 are currently unassociated with but have the option of associating with.

In various implementations, the controller 30 utilizes the client information 52 to group the access points 50 into one of several access point groups 90 (e.g., into a first access point group 90a or a second access point group 90b). In various implementations, the controller 30 groups the access points 50 such that each client device 70 can detect access points from two or more access point groups. As a result, if one access point group is taken offline for an upgrade, the client device is able to connect with an access point from another group thereby maintaining network connectivity of the client device. In the example of FIG. 1B, the first and fourth access points 50a and 50d are grouped into the first access point group 90a, and the second and third access points 50b and 50c are grouped into the second access point group 90b.

Figure 1C:
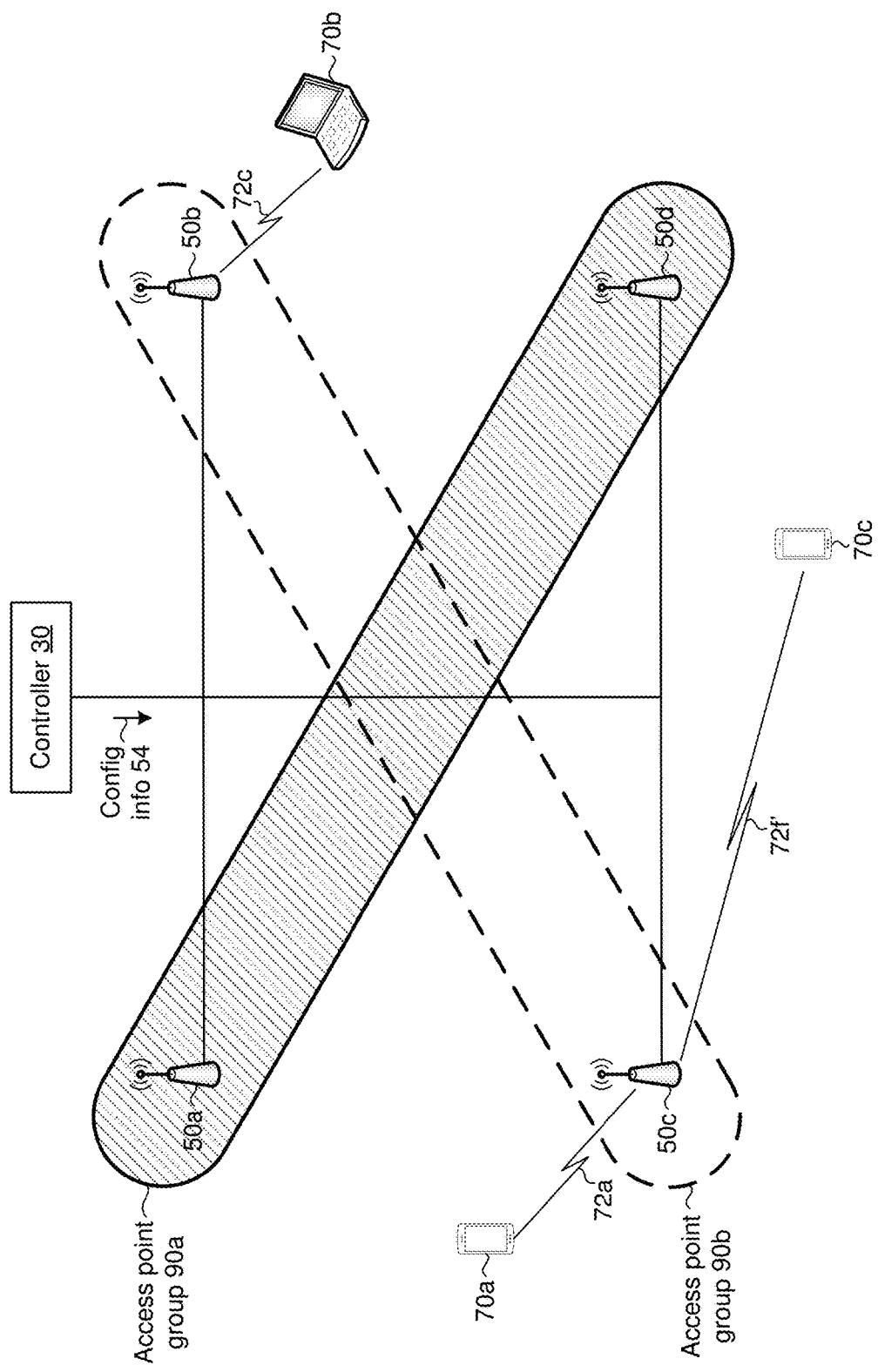

Referring to FIG. 1C, the first access point group 90a is taken offline, for example, in order to upgrade the access points in the first access point group 90a. Prior to the first access point group 90a being taken offline, the controller 30 migrates (e.g., steers) the third client device 70c from the fourth access point 50d to the third access point 50c. The dashed link 72f becomes a solid link 72f' to indicate that the third client device 70c is associated with the third access point 50c. Since the third client device 70c was migrated (e.g., steered) from the fourth access point 50d to the third access point 50c prior to the fourth access point 50d being taken offline, the third client device 70c does not experience a loss in network connectivity. Hence, grouping access points 50 and staggering upgrades of access point groups 90 reduces network connectivity loss for client devices 70 and increases network availability.

In some implementations, the controller 30 transmits configuration information 54 to the access points 50. In some implementations, the configuration information 54 includes a target firmware image. In some implementations, the controller 30 instructs the first and fourth access points 50a and 50d in the first access point group 90a to configure themselves in accordance with the configuration information 54 after the client devices 70 have been migrated away from the first access point group 90a. As such, after the client devices 70 are migrated away from the first access point group 90a, the first and fourth access points 50a and 50d install the target firmware image. After the access points in the first access point group 90*a* have been upgraded, the access points in the first access point group 90*a* are rebooted for the configuration to take effect. Once the upgraded configuration takes effect, the access points in the first access point group 90*a* are back online with their upgraded configuration. After the access points in the first access point groups 90*a* back online, the controller 30 migrates the client devices 70 associated with the second access point group 90*b* to the first access point group 90*a* so that the access points in the second access point group 90*b* can be upgraded without causing a network connectivity loss for any of the client devices 70. In some implementations, the access points 50 download the target firmware image concurrently, and the controller 30 controls when the access points 50 install the target firmware image and reboot themselves.

Figure 1D:
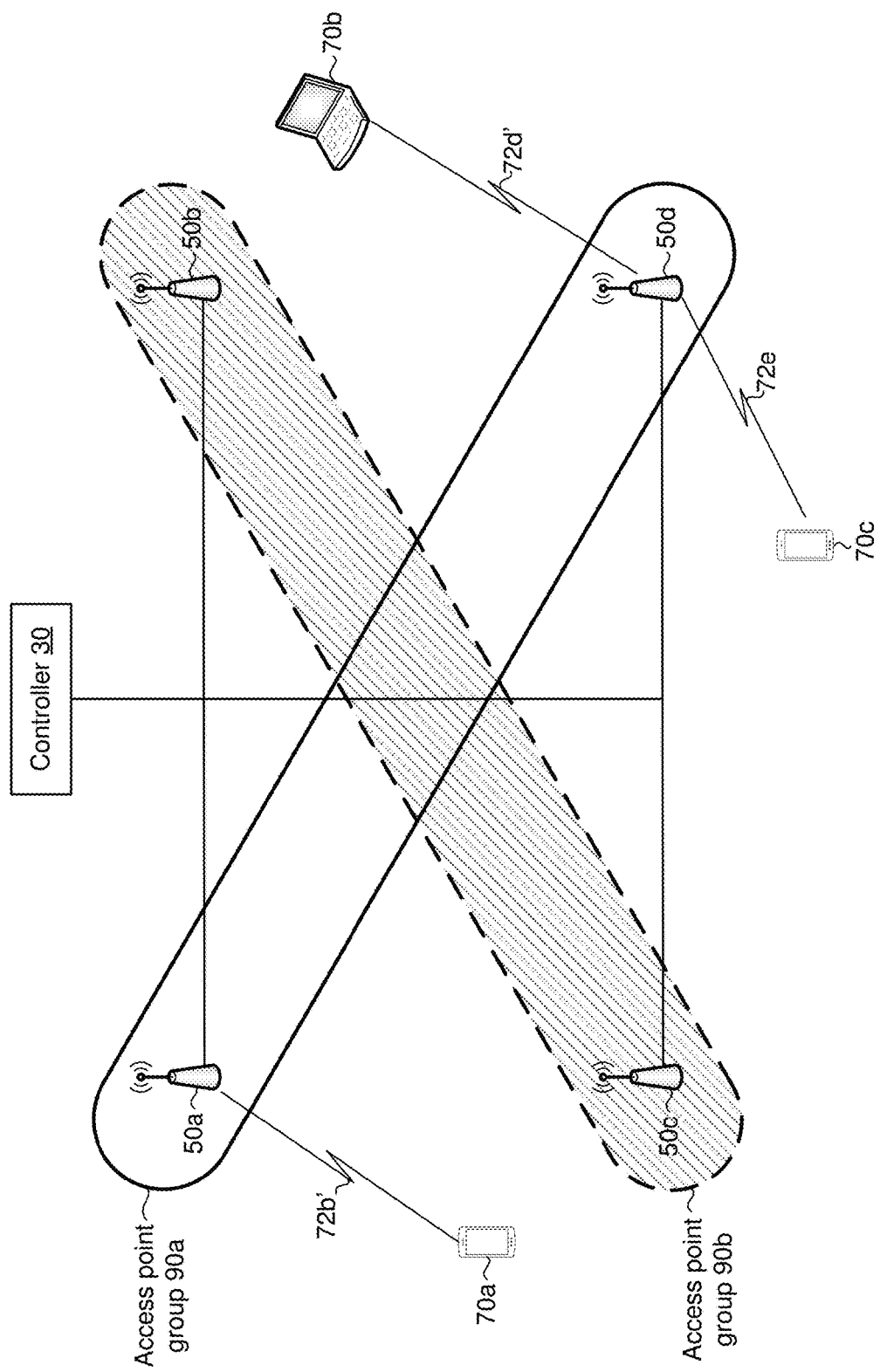

Referring to FIG. 1D, the second access point group 90*b* is taken offline in order to upgrade (e.g., reboot) the access points in the second access point group 90*b*. Prior to the second access point group 90*b* being taken offline, the controller 30 migrates the client devices 70 to access points in the first access point group 90*a*. For example, the dashed link 72*b* becomes a solid link 72*b'* to indicate that the first client device 70*a* is now associated with the first access point 50*a*. Similarly, the dashed link 72*d* becomes a solid link 72*d'* to indicate that the second client device 70*b* is now associated with the fourth access point 50*d*. The third client device 70*c* is also associated with the fourth access point 50*d*, as indicated by the solid link 72*e*.

Since all the client devices 70 previously associated with the second access point group 90*b* have been migrated away (e.g., steered away) from the second access point group 90*b*, when the second access point group 90*b* is taken offline none of the client devices 70 will experience a loss of network connectivity. In some implementations, when all access point groups 90 have been upgraded, the controller 30 rebalances the client devices 70 across the access point groups 90 in order to avoid overloading any particular access point group 90. For example, after the second access point group 90*b* is upgraded, the controller 30 steers some of the client devices 70 back onto the second access point group 90*b* in order to avoid overloading the access points in the first access point group 90*a*.

While the example of FIGS. 1A-1D illustrates two access point groups 90*a* and 90*b*, a person of ordinary skill in the art will understand from the present disclosure that the formation of additional access point groups is also contemplated. For example, in some implementations, the controller 30 groups the access points 50 into three access point groups. More generally, in various implementations, a set of access points may be grouped into five access point groups, seven access point groups, etc.

Figure 2:
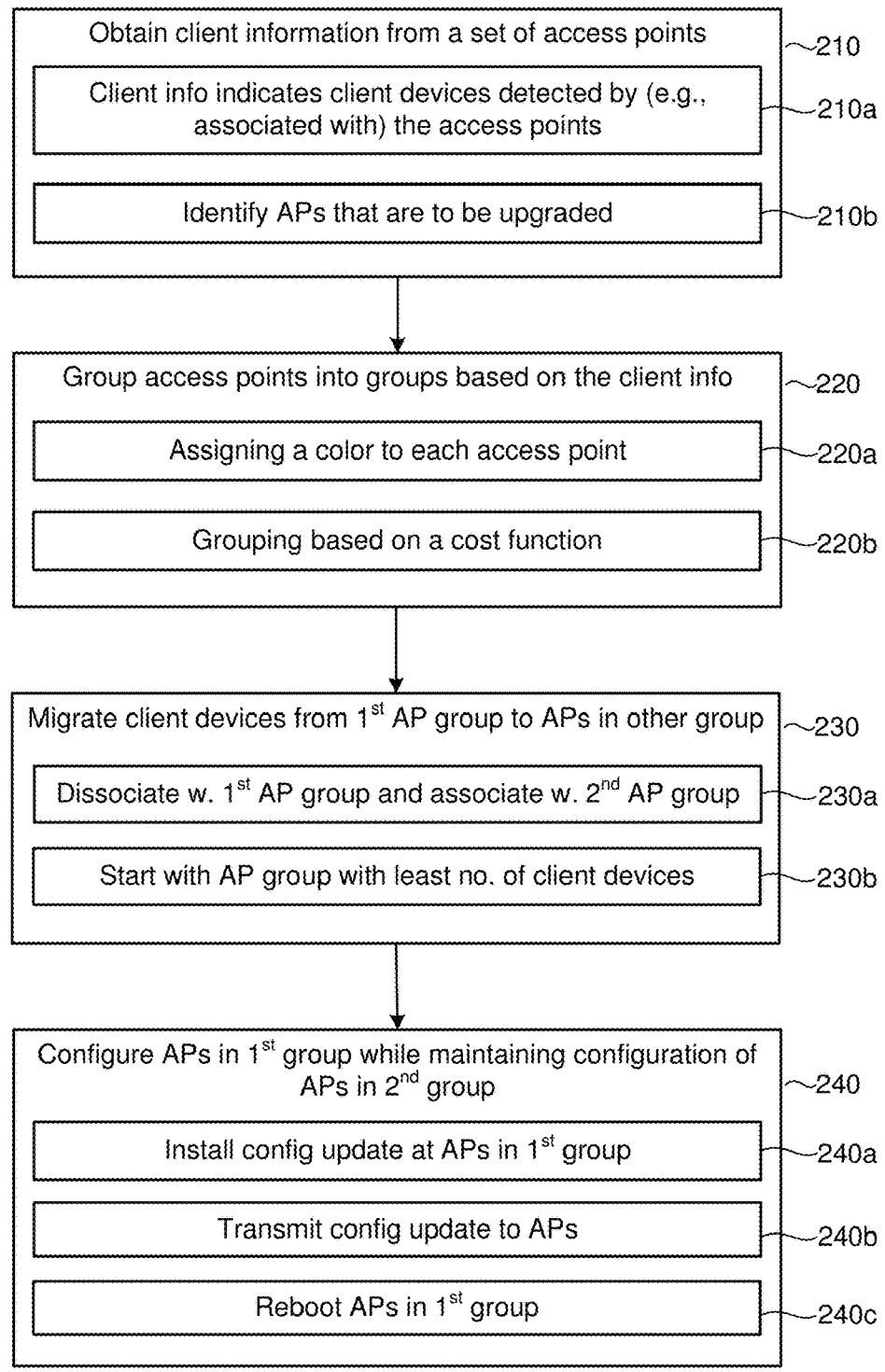
FIG. 2 is a flowchart representations of a method for configuring a group of access points in accordance with some implementations.

FIG. 2 is a flowchart representation of a method 200 for configuring a group of access points in accordance with some implementations. In various implementations, the method 200 is implemented as a set of computer readable instructions that are executed at a device (e.g., at the controller 30 shown in FIGS. 1A-1D). Briefly, the method 200 includes obtaining client information from a set of access points, grouping the access points based on the client information, for a first group of access points, migrating client devices associated with access points in the first group to access points in a second group, and configuring the access points in the first group while maintaining configuration of the access points in the second group. In the present disclosure, "access point group", "group of access points", and "group" are used interchangeably.

As represented by block 210, in some implementations, the method 200 includes obtaining client information from a set of access points. For example, as shown in FIG. 1B, the controller 30 receives the client information 52 from the access points 50. As represented by block 210*a*, in some implementations, the client information indicates client devices detected by each access point in the set of access points. In some implementations, the client information indicates client devices that are currently associated with each access point. In some implementations, the client information also indicates client devices that are currently unassociated with each access point but can be associated with the access points due to geographical proximity.

As represented by block 210*b*, in some implementations, the method 200 includes identifying the access points that are to be upgraded. In some implementations, the method 200 includes querying the access points for a version number of their current firmware/software, and identifying the access points that have an outdated version of the firmware/software.

In some implementations, the method 200 includes staging the access points. In some implementations, the method 200 includes collecting a list of access points that are to be upgraded and instructing those access points to download a target firmware image. In some implementations, the method 200 includes receiving respective messages from the access points indicating that the access points have downloaded the target firmware image and are staged (e.g., ready for the upgrade). In some implementations, after a predetermined amount of time passes (e.g., a set timeout period expires), access points that fail to report as staged are excluded from the current upgrade cycle. Such access points may be included in a subsequent upgrade cycle or in a second pass of the current upgrade cycle. Although staged access points possess a copy of the target firmware image, the access points do not start the upgrade process until receiving an instruction from the controller. In some implementations, the access points obtain the target firmware image via peer-to-peer distribution in order to lower the burden on a shared uplink.

In some implementations, the method 200 includes requesting client information from the access points that are staged. In some implementations, the method 200 includes receiving, from each access point, a list of all associated client devices and their respective signal strength. In some implementations, the method 200 includes receiving, from each access point, a list of all detected but unassociated client devices, respective times at which the client devices were detected, and their corresponding signal strength. In some implementations, the method 200 includes generating a mapping between the access points and their client devices based on the client information. In some implementations, the method 200 includes generating a bipartite graph based on the client information.

As represented by block 220, in some implementations, the method 200 includes grouping the set of access points into a plurality of access point groups based on the client information. For example, as shown in FIG. 1B, the controller 30 groups the access points 50 into a first access point group 90*a* or a second access point group 90*b* based on the client information 52. In some implementations, the grouping provides each client device with an option to associate with access points from at least two different access point groups. Providing client devices the option to associate with access points from two or more access point groups reduces network connectivity loss thereby providing an improved network of access points. For example, if a particular access point group is taken offline (e.g., due to an ongoing upgrade), then client devices can connect to access points in another access point group that is currently online.

As represented by block 220a, in some implementations, each access point group is associated with a respective color. In such implementations, grouping the access points includes assigning one of the colors to each access point. Referring to the example of FIG. 1B, in some implementations, the first access point group 90a is associated with the color 'blue' and the second access point group 90b is associated with the color 'green'. In such implementations, grouping the access points 50 includes assigning either the color 'blue' or the color 'green' to each access point. In various implementations, grouping the access points includes performing a graph coloring operation in which each access point is assigned a color. In such implementations, access points of the same color form an access point group, and access points in a particular access point group reboot concurrently.

As an example, if a particular client device A detects three access points (e.g., AP1, AP2 and AP3), then the method 200 includes forming the largest possible group such that when all access points in the group reboot, client device A can still associate with at least one access point that is online and capable of serving the client device A. In this example, AP1 and AP2 can be assigned 'color 1' and AP3 can be assigned 'color 2'. While all access points with 'color 1' are offline due to an ongoing upgrade, the client device A can still associate with AP3 because AP3 is assigned 'color 2' and not 'color 1'. Once all access points assigned 'color 1' have rebooted, the method 200 includes rebooting the next group (e.g., the access points that have been assigned 'color 2'). In this example, as long as only one of the two groups is rebooted at a given time, the client device A will retain connectivity to the network. In some implementations, client devices are able to roam between different access points, for example, because the access points have the same service set identifier (SSID).

As represented by block 220b, in some implementations, the method 200 includes grouping the access points based on a cost function associated with each color. In some implementations, the method 200 includes determining a cost for each of the colors, and assigning one of the colors to each access point based on the cost of the colors. In some implementations, similar to graph coloring, grouping the access points is considered an NP-hard operation. In some implementations, grouping the access points includes utilizing a greedy algorithm and performing one or more of the operations described herein for each of the access points.

In some implementations, the method 200 includes starting with two possible colors. In some implementations, the method 200 includes iterating through all possible colors for each access point. In some implementations, the method 200 includes utilizing a cost function for each color in order to determine a suitability of the color. In some implementations, the method 200 includes, for each color, determining whether any client devices would be dropped if the color is assigned to the access point. In some implementations, the method 200 includes determining whether all access points that detect a particular client device have been assigned a candidate color. If there are access points that have not been assigned the candidate color and can potentially serve this particular client device, then no client drop cost is allocated to the candidate color. However, if all access points have been assigned the candidate color and there are no potential access points that can serve this particular client device, then a client drop cost is allocated to the candidate color. In some implementations, the client drop cost is a function of a number of dropped client devices. In some implementations, the client drop cost for associated client devices is higher than the client drop cost for unassociated client devices. As such, in various implementations, the method 200 includes determining respective costs for the colors.

In some implementations, the method 200 includes assigning the access point a color that has zero cost. In some implementations, if no color has a zero cost, then the method 200 includes comparing the lowest color cost with a threshold (e.g., a fixed new color cost). If the lowest color cost is lower than the threshold, then the method 200 includes assigning the corresponding color to the access point. However, if the lowest color cost is greater than the threshold, then the method 200 includes introducing a new color to the available set of colors and assigning the new color to the access point.

In some implementations, the method 200 includes adjusting the cost function in order to adjust a balance between a number of desired groups and a number of dropped client devices. In some implementations, the method 200 includes adjusting the threshold in order to adjust a balance between total upgrade time and a number of dropped client devices. In some implementations, the method 200 includes assigning colors until all access points are assigned a color. In some implementations, a number of expected groups is a function of a density of access point deployment. In some implementations, the number of groups ranges from three to eight for most network topologies.

As represented by block 230, in various implementations, the method 200 includes, for a first access point group of the plurality of access point groups, migrating the client devices associated with access points in the first access point group to access points in a second access point group of the plurality of access point groups. For example, as shown in FIGS. 1B-1C, the controller 30 migrates (e.g., steers) the client devices 70 associated with access points in the first access point group 90a to access points in the second access point group 90b. As represented by block 230a, in some implementations, the method 200 includes dissociating the client devices from access points in the first access point group and associating the client devices with access points in the second access point group. For example, referring to the example of FIGS. 1B-1C, client devices 70 dissociate from access points in the first access point group 90a and associate with access points in the second access point group 90b prior to the access points in the first access point group 90a being upgraded. In some implementations, the method 200 includes starting the upgrade with the access point group that has the least number of associated client devices.

In some implementations, the method 200 includes, for each access point group, rebalancing client devices associated with access points in the access point group. In some implementations, the method 200 includes starting the upgrade with an access point group based on a predetermined metric. For example, as represented by block 230b, in some implementations, the method 200 includes starting the upgrade with the access point group with the fewest associated client devices. In some implementations, starting with the access point group with the greatest number of associated client devices tends to result in more migrations of client devices (e.g., more roaming) between access points. By contrast, starting the upgrade with the access point group with the fewest number of associated client devices tends to result in fewer migrations of client devices (e.g., reduced roaming) between access points.

In some implementations, the method 200 includes forgoing responding to probes or association requests sent to the access points that are going to be upgraded. In some implementations, the method 200 includes utilizing client steering to push client devices to access points of other colors. In some implementations, the method 200 includes utilizing the features described in the IEEE 802.11v standard, which are incorporated herein by reference, in order to perform client steering. In some implementations, the method 200 includes exchanging topology information between the access points and the client devices using IEEE 802.11k messages. This allows an access point to move associated client devices to a different access point in the same network. In some implementations, the method 200 includes dissociating the client devices from access points that are in the access point group that is about to be upgraded. In some implementations, utilizing client steering tends to result in reduced packet loss.

In some implementations, the method 200 includes selecting the target access point for the client devices that are being moved based on a metric. In some implementations, the method 200 includes selecting the target access point based on the access point traffic load, the access point load, or the RSSI strength between the target access point and the client device. In some implementations, utilizing a metric to select the target access point allows distributing the client devices across several access points. In some implementations, some access points advertise their current load.

In some implementations, client devices are dissociated from the access points that are about to be upgraded in a staggered manner. This reduces the staggering herd problem where all recently dissociated access points are attempting to associated with a new access point at the same time. In some implementations, the method 200 includes spreading the steering over an extended time duration.

In some implementations, the method 200 includes sending a message to a target access point indicating that the target access point is about to receive association requests from particular client devices. In some implementations, the target access point stops responding to probes and association requests from other client devices in order to be able to serve the particular client devices that are being steered towards the target access point.

As represented by block 240, in various implementations, the method 200 includes configuring the access points in the first access point group while maintaining configuration of the access points in the second access point group. As represented by block 240a, in some implementations, the method 200 includes installing a configuration update at access points in the first access point group. In some implementations, the method 200 includes installing the target firmware image that was downloaded during the staging. Referring to the example of FIGS. 1B-1C, the access points in the second access point group 90b are not upgraded while the access points in the first access point group 90a are being upgraded. As represented by block 240b, in some implementations, the method 200 includes transmitting a configuration update to the access points (e.g., configuration information 54 shown in FIG. 1C, for example, the target firmware image). As represented by block 240c, in some implementations, the method 200 includes rebooting the access points in the first access point group in order for the configuration update to take effect. In some implementations, the method 200 includes waiting for the access points to finish rebooting before upgrading the next access point group. In some implementations, the method 200 includes performing another pass of the upgrade cycle in order to upgrade the access points that were not included in the current pass of the upgrade cycle.

In some implementations, the operations described herein result in fewer connection drops (e.g., zero connection drops) for associated client devices. In some implementations, the operations described herein result in fewer lost packets (e.g., zero packet loss) as client devices migrate between access points. In some implementations, the operations described herein result in an upgrade of the entire network in fewer reboot cycles (e.g., two reboot cycles). In some implementations, the operations described herein result in balanced access points (e.g., evenly balanced access points). In some implementations, the operations described herein allow network operators to monitor the reboot sequence before the reboots are initiated. In some implementations, the operations described herein allow network operators to monitor statistics regarding change in client distribution and dropping of clients.

Figure 3:
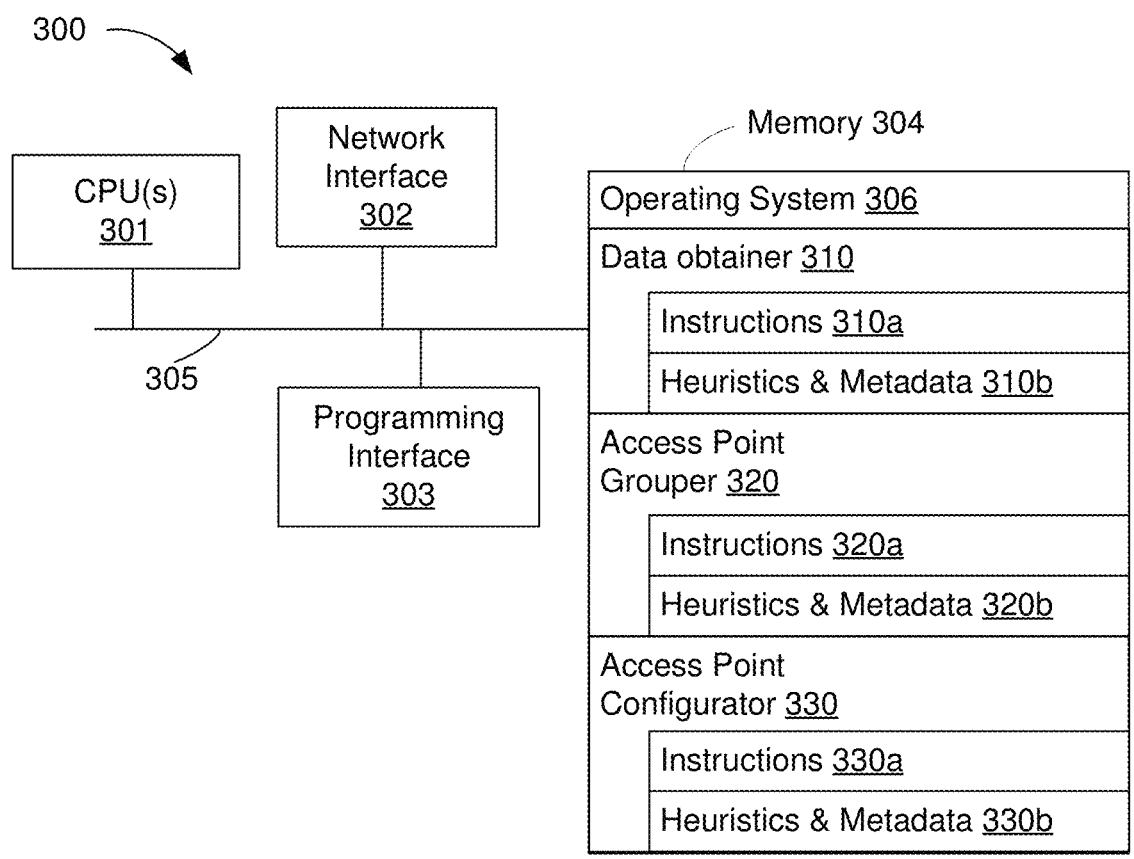
FIG. 3 is a block diagram of a device enabled with various modules that are provided to configure a group of access points in accordance with some implementations.

FIG. 3 is a block diagram of a device 300 enabled with one or more components of a device (e.g., a controller, for example, the controller 30 shown in FIGS. 1A-1D) that configures a group of access points in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 300 includes one or more processing units (CPUs) 301, a network interface 302, a programming interface 303, a memory 304, and one or more communication buses 305 for interconnecting these and various other components.

In some implementations, the network interface 302 is provided to, among other uses, establish and maintain a metadata tunnel between a cloud hosted network management system and at least one private network including one or more compliant devices. In various implementations, the network interface 302 allows the device 300 to communicate with devices that are upstream or downstream relative to the device 300 in a hierarchy. In some implementations, the communication buses 305 include circuitry that interconnects and controls communications between system components. The memory 304 includes high-speed random access memory, such as DRAM, SRAM, DDR RAM or other random access solid state memory devices and may include non-volatile memory, such as one or more magnetic disk storage devices, optical disk storage devices, flash memory devices, or other non-volatile solid state storage devices. The memory 304 optionally includes one or more storage devices remotely located from the CPU(s) 301. The memory 304 comprises a non-transitory computer readable storage medium.

In some implementations, the memory 304 or the non-transitory computer readable storage medium of the memory 304 stores the following programs, modules and data structures, or a subset thereof including an optional operating system 306, a data obtainer 310, an access point grouper 320, and an access point configuration 330. In some implementations, the data obtainer 310 obtains client information from various access points. For example, as described in relation to operation 210 shown in FIG. 2, in some implementations, the data obtainer 310 obtains the client information 52 shown in FIG. 1B from the access points 50. To that end, in various implementations, the data obtainer 310 includes instructions and/or logic 310a, and heuristics and metadata 310b.

In some implementations, the access point grouper 320 groups access points into one of several access point groups. For example, as described in relation to operation 220 shown in FIG. 2, in some implementations, the access point grouper 320 groups the access points 50 shown in FIG. 1B into the first access point group 90a or the second access point group 90b. To that end, in various implementations, the access point grouper 320 includes instructions and/or logic 320a, and heuristics and metadata 320b.

In some implementations, the access point configurator 330 migrates client devices away from a group of access points and configures the group of access points after the client devices have been migrated away from the group of access points. For example, as described in relation to operations 230 and 240 shown in FIG. 2, in some implementations, the access point configurator 330 migrates the client devices 70 away from the first access point group 90a and upgrades the access points in the first access point group 90a after migrating the client devices 70 away from the first access point group 90a. To that end, in various implementations, the access point configurator 330 includes instructions and/or logic 330a, and heuristics and metadata 330b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a controller including a non-transitory memory and one or more processors coupled with the non-transitory memory:
        obtaining client information from access points, the client information indicating client devices detected by each of the access points;
        grouping the access points into a plurality of access point groups based on the client information, the grouping causing each of the client devices to be associated with at least two different access point groups, the at least two different access point groups including a first access point group and a second access point group;
        migrating one or more of the client devices associated with first access points in the first access point group to second access points in the second access point group; and
        configuring the first access points in the first access point group while maintaining a configuration of the second access points in the second access point group.

2. The method of claim 1,
    wherein,
        each of the plurality of access point groups is associated with one of a plurality of colors, and
        the grouping of the access points includes assigning one of the plurality of colors to each of the access points.

3. The method of claim 2,
    wherein,
        each of the plurality of colors is associated with a cost, and
        the plurality of colors are assigned based on the cost.

4. The method of claim 3, wherein the cost is a function of a number of client devices that lose connectivity when an associated one of the access points is being configured.

5. The method of claim 1, wherein the migrating of the one or more of the client devices includes:
    dissociating the one or more of the client devices from the first access points in the first access point group; and
    associating the one or more of the client devices with the second access points in the second access point group.

6. The method of claim 1, wherein the configuring of the access points includes:
    installing a configuration update at the first access points in the first access point group and rebooting the first access points in the first access point group; and
    maintaining the configuration of the second access points in the second access point group at least until the first access points in the first access point group have rebooted.

7. The method of claim 1, further comprising:
    transmitting configuration information to the set of access points.

8. The method of claim 1, further comprising:
determining that each access point in the set of access points is to be updated.

9. A controller comprising:
a processor provided configured to execute computer readable instructions; and
a non-transitory memory including the computer readable instructions that, when executed by the processor, cause the controller to:
   obtain client information from access points, the client information indicating client devices detected by each of the access points;
   group the access points into a plurality of access point groups based on the client information, the grouping causing each of the client devices to be associated with an access point from at least two different access point groups, the at least two different access point groups including a first access point group and a second access point group;
   migrate one or more of the client devices associated with first access points in the first access point group to second access points in the second access point group; and
   configure the first access points in the first access point group while maintaining a configuration of the second access points in the second access point group.

10. The controller of claim 9,
wherein,
   each of the plurality of access point groups is associated with one of a plurality of colors, and
   grouping the access points includes assigning one of the plurality of colors to each of the access points.

11. The controller of claim 10,
wherein,
   each of the plurality of colors is associated with a cost, and
   the plurality of colors are assigned based on the cost of the colors.

12. The controller of claim 11, wherein the cost is a function of a number of client devices that lose connectivity when an associated one of the access points is being configured.

13. The controller of claim 9, wherein migrating the one or more of the client devices includes:
   dissociating the one or more of the client devices from the first access points in the first access point group; and
   associating the one or more of the client devices with the second access points in the second access point group.

14. The controller of claim 9, wherein configuring the access points comprises:
   installing a configuration update at the first access points in the first access point group and rebooting the first access points in the first access point group; and
   maintaining the configuration of the second access points in the second access point group at least until the first access points in the first access point group have rebooted.

15. The controller of claim 9, wherein the computer readable instructions further cause the controller to:
   transmit configuration information to the access points.

16. The controller of claim 9, wherein the computer readable instructions further cause the controller to:
   determine that each of the access points is to be updated.

17. A non-transitory computer readable storage medium storing one or more programs, the one or more programs comprising instructions that, when executed by a controller, cause the controller to:
   obtain client information from access points, the client information indicating client devices detected by each of the access points;
   group the access points into a plurality of access point groups based on the client information, the grouping causing each of the client devices to be associated with an access point from at least two different access point groups, the at least two different access point groups including a first access point group and a second access point group;
   migrate one or more of the client devices associated with first access points in the first access point group to second access points in the second access point group; and
   configure the first access points in the first access point group while maintaining a configuration of the second access points in the second access point group.

18. The non-transitory computer readable storage medium of claim 17,
wherein,
   each of the plurality of access point groups is associated with one of a plurality of colors, and
   the grouping of the set of access points includes assigning one of the plurality of colors to each of the access points.

19. The non-transitory computer readable storage medium of claim 18,
wherein,
   each of the plurality of colors is associated with a cost, and
   the plurality of colors are assigned based on the cost.

20. The non-transitory computer readable storage medium of claim 19, wherein the cost is a function of a number of client devices that lose connectivity when an associated one of the access points is being configured.

* * * * *